(12) United States Patent
Vader

(10) Patent No.: US 6,386,613 B1
(45) Date of Patent: May 14, 2002

(54) TRUCK REAR DOOR OPENING MECHANISM

(75) Inventor: Scott J. Vader, Toronto (CA)

(73) Assignee: Unicell Limited, Ontario (CA)

( * ) Notice: Subject to any disclaimer, the term of this patent is extended or adjusted under 35 U.S.C. 154(b) by 0 days.

(21) Appl. No.: 09/669,968

(22) Filed: Sep. 26, 2000

(51) Int. Cl.⁷ .............................................. B60P 1/267
(52) U.S. Cl. ...................... 296/50; 296/56; 296/146.12
(58) Field of Search ........................ 296/50, 56, 146.8, 296/202, 146.12; 49/339, 340, 342, 343, 345

(56) References Cited

U.S. PATENT DOCUMENTS

| | | | | |
|---|---|---|---|---|
| 3,713,472 A | * | 1/1973 | Dozois | 296/56 |
| 3,716,945 A | * | 2/1973 | Cooper et al. | 296/56 |
| 4,165,897 A | * | 8/1979 | Schmidt | 296/56 |
| 4,620,743 A | * | 11/1986 | Eke | 296/56 |
| 4,818,009 A | | 4/1989 | Muscat | 296/106 |
| 5,101,921 A | | 4/1992 | West et al. | 180/69.21 |
| 5,531,498 A | * | 7/1996 | Kowall | 296/56 |
| 5,577,793 A | * | 11/1996 | Kobasic | 296/146.12 |
| 5,851,049 A | * | 12/1998 | Squire et al. | 296/56 |
| 6,007,139 A | * | 12/1999 | Shave | 296/56 |
| 6,068,327 A | * | 5/2000 | Junginger | 296/56 |
| 6,089,640 A | * | 7/2000 | Cart | 296/56 |
| 6,142,551 A | * | 11/2000 | Ciavaglia et al. | 296/56 |
| 6,152,502 A | * | 11/2000 | Rossi | 296/56 |
| 6,170,196 B1 | * | 1/2001 | Kato | 296/56 |

FOREIGN PATENT DOCUMENTS

| | | | | |
|---|---|---|---|---|
| EP | 0111457 | * | 11/1983 | 296/56 |
| FR | 2700504 | * | 1/1993 | 296/56 |
| GB | 2161858 A | * | 7/1985 | 296/56 |
| JP | 63-103732 | * | 5/1988 | 296/56 |

* cited by examiner

*Primary Examiner*—Ken Patel
(74) *Attorney, Agent, or Firm*—Ronald D. Faggetter; Mark R. Wisner

(57) ABSTRACT

A four bar link is provided between a walled cargo area of a truck and a rigid rear cargo door. The effective length of the lower link of the four bar linkage is longer than that of the upper link such that the motion of the door is generally up and over the top of the truck body. An eccentric cam is joined to the upper link with a tensioned spring extending around the cam such that the spring slackens as the door opens. The cam is configured so that, as the door is opened, the spring slackens more slowly initially then more quickly. This allows the door to be moved initially mostly outwardly before moving significantly upwardly and still be effectively counterbalanced throughout its motion.

11 Claims, 4 Drawing Sheets

TRUCK REAR DOOR OPENING MECHANISM

FIELD OF THE INVENTION

This invention relates to a rear door opening mechanism for a truck and to a truck body with a rear door opening mechanism.

BACKGROUND OF THE INVENTION

Cube vans and step-up vans have a walled cargo area closed by a rear door. Typically, the rear door is a so-called "roll-up" door. A roll up door has a number of laterally elongated rectangular sections which are hinged together. Rollers extending from the door sections are received in guide channels. The guide channels have a lower portion extending vertically from the base of the cargo area and then curve to an upper portion extending horizontally along the inside of the roof of the cargo area. The door is opened by lifting vertically which causes the panels to ride along the guide channels such that consecutive panels cant to a horizontal orientation and are received by the upper portion of the guide channels.

A roll up door suffers from several drawbacks. Firstly, since the guide channels extend along the inside of the roof of the cargo area, the roll up door reduces the effective size of the cargo area. Secondly, the hinge points between door panels can let in water and dust. Additionally, these doors require a fair degree of effort to operate. Further, on the road, vibrations imparted to the segmented door result in nuisance noise. Finally, the segmentation of the door detracts from its appearance and does not facilitate the application of decals to the door.

This invention seeks to overcome these drawbacks.

SUMMARY OF INVENTION

The present invention provides a four bar linkage between the walled cargo area of a truck and a rear door. This allows use of a rigid rear door. The effective length of the lower link of the four bar linkage is longer than that of the upper link such that the motion of the door can be generally up and over the top of the truck body. An eccentric cam can be joined to one of the upper and lower links with a tensioned spring extending around the cam such that the spring slackens as the door opens. The cam can then be configured so that, as the door is opened, the spring will slacken more slowly initially then more quickly. This allows the door to be moved initially mostly outwardly before moving significantly upwardly and still be effectively counterbalanced throughout its motion.

According to the invention, there is provided a truck body comprising: a walled cargo area; a rigid rear cargo door for closing said cargo area; a four bar linkage having an upper link and a lower link each mounted by a pivot to a side wall of said walled cargo area and each mounted by a pivot to said rear cargo door; and a linear distance between pivots of said lower link being longer than a linear distance between pivots of said upper link.

According to another aspect of the invention, there is provided a rear cargo door opening mechanism for a truck having a walled cargo area comprising: a four bar linkage having an upper link and a lower link each for mounting by a pivot to a side wall of said walled cargo area and each for mounting by a pivot to said rear cargo door; a linear distance between pivots of said lower link being longer than a linear distance between pivots of said upper link; an eccentric cam joined to one of said upper link and said lower link; a spring for extending around said eccentric cam such that, in use, said spring is in tension and as said rear cargo door opens, said spring slackens; said eccentric cam configured such that, in use, as said rear cargo door is opened, said spring slackens more slowly proximate a closed position of said rear cargo door than proximate a point midway between a closed position and an opened position of said rear cargo door.

BRIEF DESCRIPTION OF THE DRAWINGS

In the figures which illustrate an example embodiment of the invention.

DETAILED DESCRIPTION OF THE PREFERRED EMBODIMENTS

Figure 1:
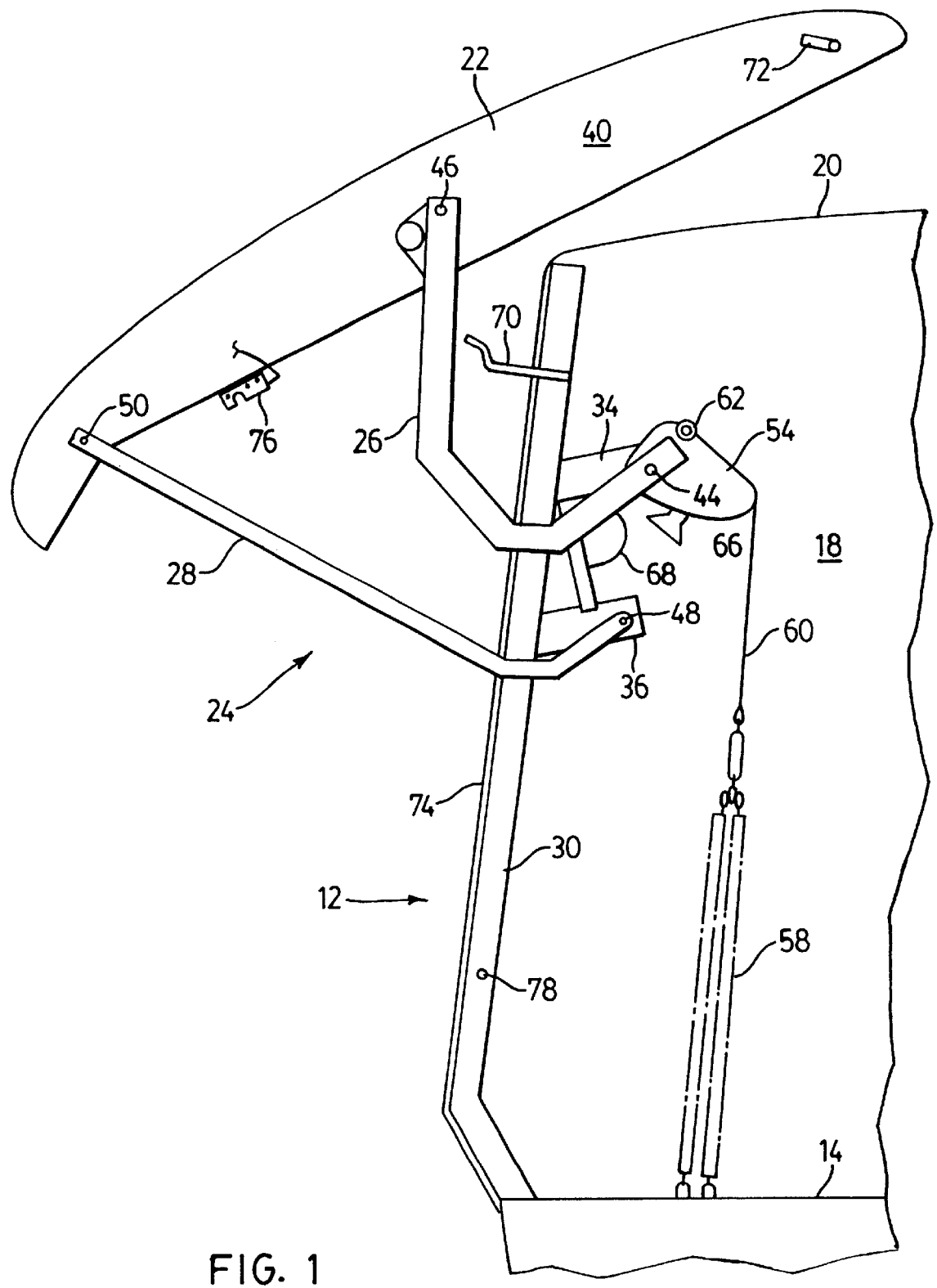
FIG. 1 is a fragmentary side view of a back portion of a truck having a rear door opening mechanism made in accordance with this invention.
Figure 3:
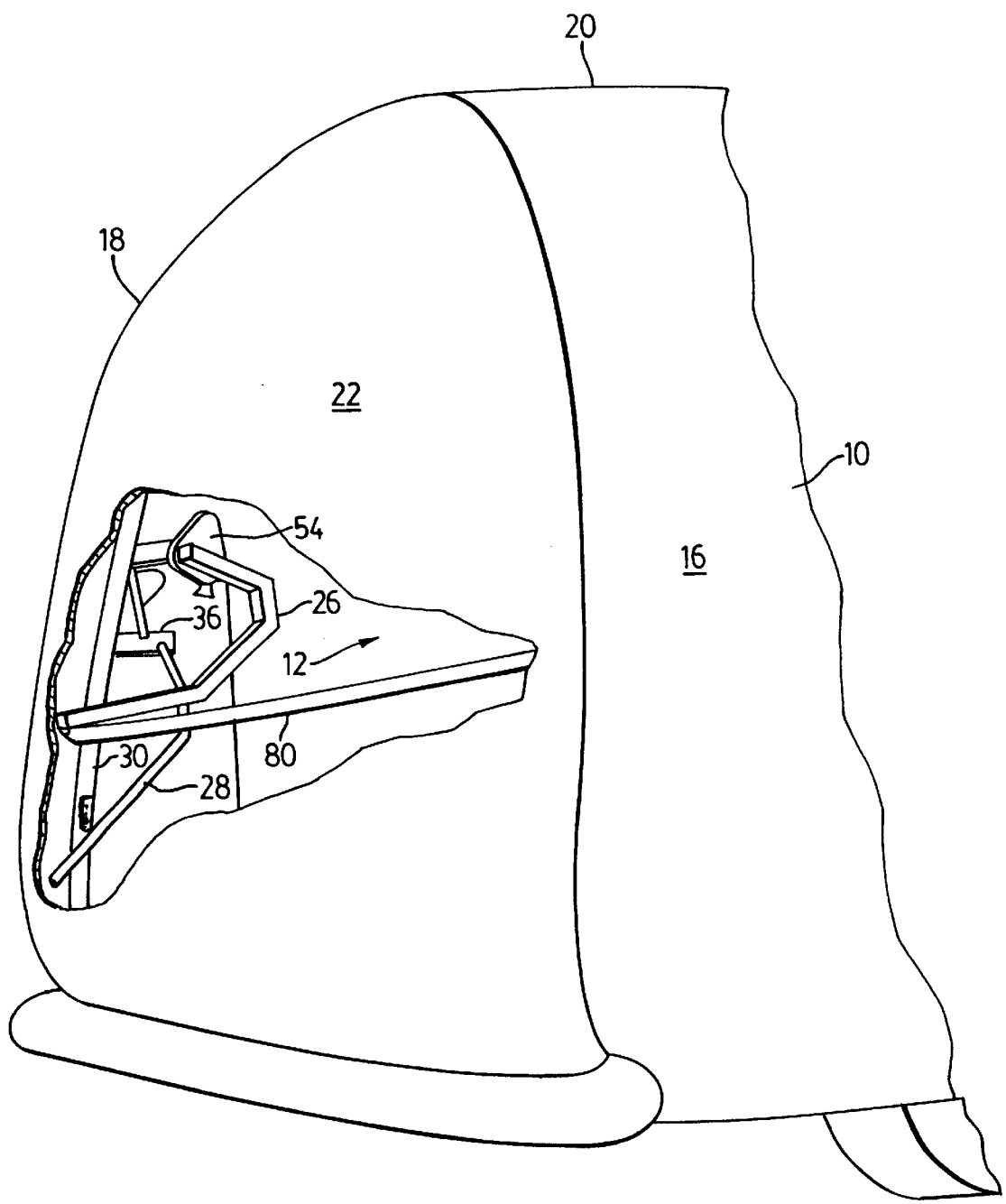
FIG. 3 is a rear, partially cut-away, perspective view of the truck of FIG. 1.

Referring to FIGS. 1 and 3, a truck body 10 has a cargo area 12 defined by floor 14, side walls 16, 18 and roof 20. A rigid cargo door 22 closes the cargo area. A four bar linkage is provided between each side wall 16, 18 and door 22. Only four bar linkage 24 at side wall 18 is shown; the four bar linkage at side wall 16 is a mirror image of four bar linkage 24. The four bars of four bar linkage 24 are as follows: an upper, generally C-shaped, link 26; a lower link 28; a side wall rib 30 with depending arms 34 and 36; and a side rib 40 of door 22. Upper link 26 is mounted to arm 34 of side wall rib 30 by pivot 44 and to rib 40 of door 22 by pivot 46. Pivot 46 is approximately vertically and horizontally aligned with the centre of gravity of the door. Lower link 28 is mounted to arm 36 of side wall rib 30 by pivot 48 and to rib 40 of door 22 by pivot 50.

The effective length of the lower link 28 (defined by the linear distance between pivots 48, 50) is longer than the effective length of the upper link 26 (defined by the linear distance between pivots 44, 46).

An eccentric cam 54 is rigidly joined to upper link 26 (but could instead be joined to the lower link). A pair of springs 58 is mounted to floor 14 of cargo area 12. The spring pair 58 has an upper tendon 60 extending around the eccentric cam 54 and mounted at mount 62 to this cam. The length of the spring pair 58 is chosen such that the spring is in tension throughout the range of motion of the door 22.

An abutment 66 extends from the eccentric cam 54 and a co-operating stop 68 extends between arms 34, 36. A first co-operating cam 70 extends from the side wall rib 30 and a second co-operating cam 72 extends from the cargo door rib 40.

All of these parts are mirrored at side 16 of the walled cargo area.

A bulb seal 74 extends along the back end of the walled cargo area. Rib 40 of door 22 supports a latch 76 which latches to pin 78.

Figure 2C:
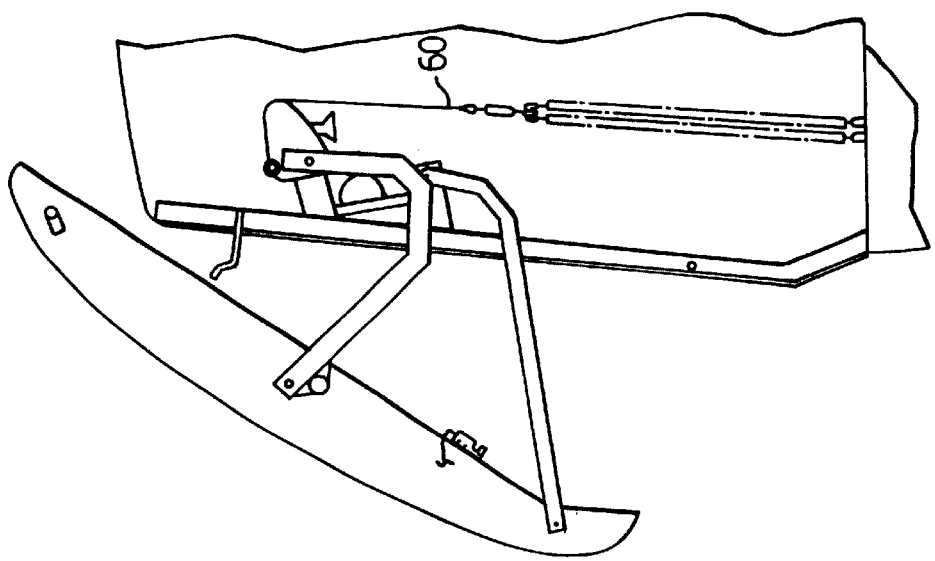
FIGS. 2a through 2f are views similar to that of FIG. 1 illustrating the opening of the rear door.

A bar 80 (FIG. 3) extends along the interior of the door 22 between upper link 26 of four bar linkage 24 to the upper link of the four bar linkage at side wall 16. The bar constrains yaw motion in the door 22 and, therefore, maintains parallelism between, on the one hand, links 26 and 28 at side wall 18 and, on the other hand, the corresponding links at side wall 16, Referencing FIG. 2a, when the door 22 is closed, there is an angle α between centreline 82 extending between pivots 44, 46 and centreline 84 extending between pivots 48, 50. Angle α should be close to zero degrees and hence is preferably smaller than 25 degrees. With angle α small, centrelines 82 and 84 are substantially parallel.

Figure 2B:
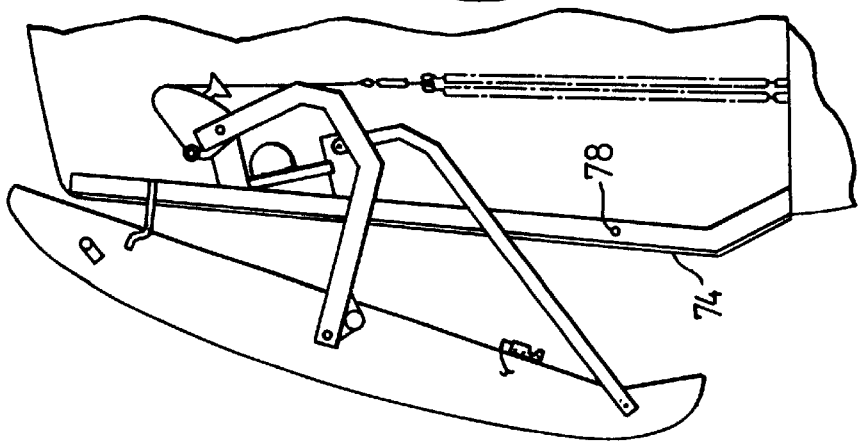
Figure 2A:
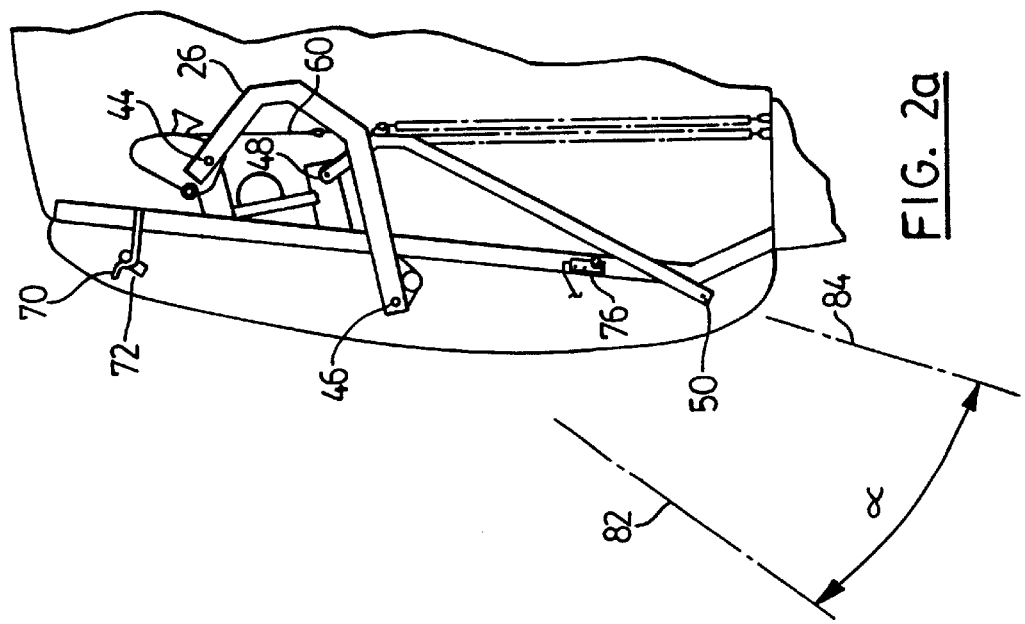
Figure 2F:
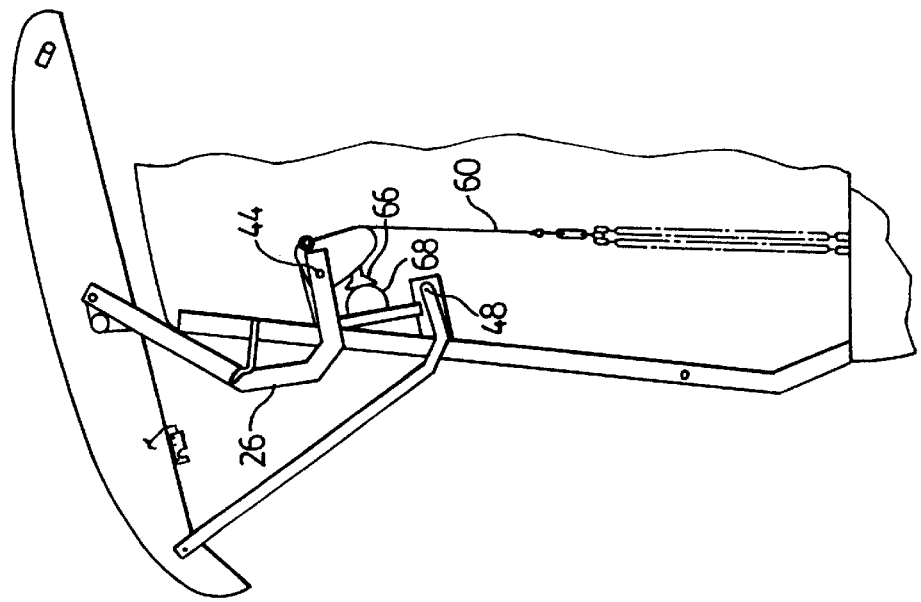
Figure 2E:
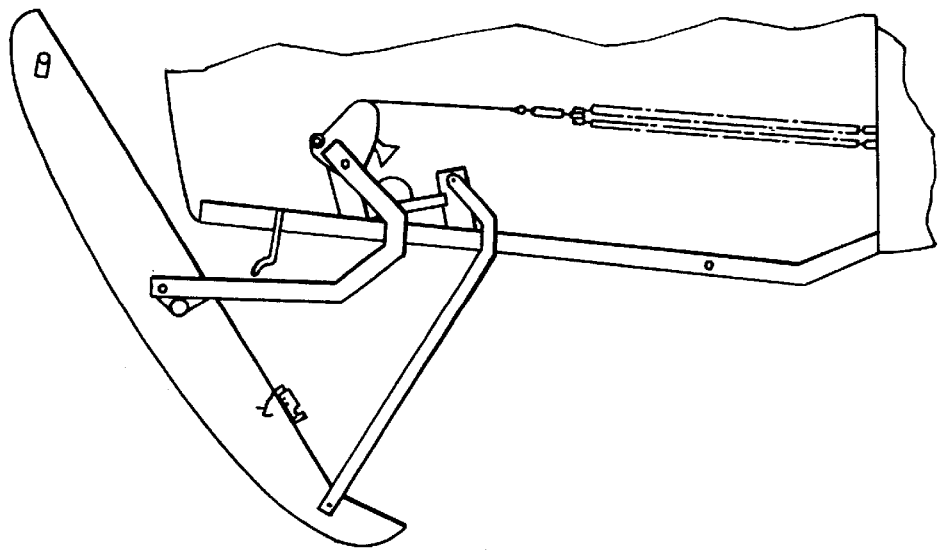
Figure 2D:
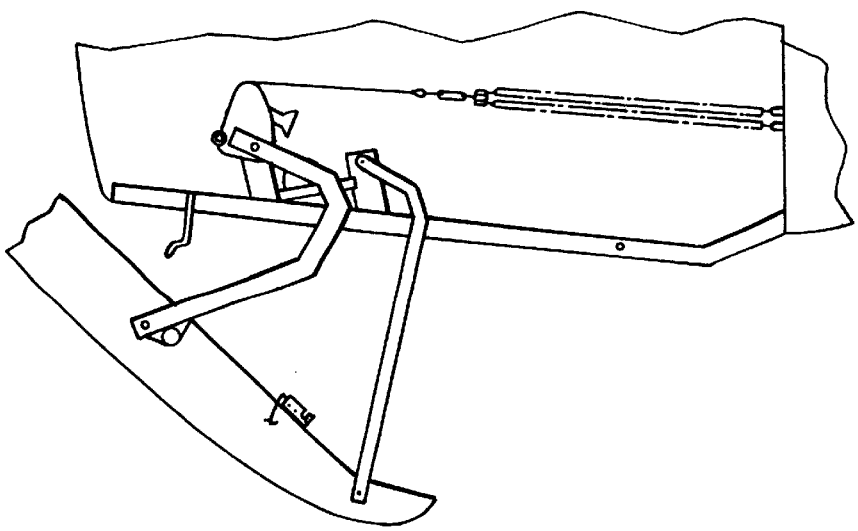

With centrelines 82 and 84 substantially parallel, turning to FIG. 2b, as door 22 begins to open, the primary component of motion of the door will be rearwardly and only a small component of the motion will be upwardly. This allows the door to pull away from the seal 74. As the door continues to open (FIG. 2c), the primary component of motion of the door is upwardly. Then the door begins to move forwardly over the top of the truck body (FIGS. 2d and 2e). The fully open position is defined by the abutment 66 on the eccentric cam 54 abutting stop 68 (FIG. 2f). The stop is positioned so that at the fully open position of the door, the door remains clear of the top of the truck body. Additionally, the C-shape of upper link 26 is such that the upper link remains clear of the top of the truck body.

It will be apparent that as the door opens, the eccentric cam rotates with the upper link 26. Referencing FIGS. 2a to 2f, it will be apparent that the configuration of the eccentric cam is such that as the rear cargo door is opened, the spring pair 58 slackens more slowly proximate the door closed position (of FIG. 2a) than elsewhere in the travel of the door, including the door open position (of FIG. 2f). Further, the spring pair 58 slackens most rapidly where the door is about midway between being opened and closed (see FIGS. 2c and 2d). This operation results from the radius between pivot 44 and the tangent point where tendon 60 meets the eccentric cam 54 being shorter proximate the door closed position (of FIG. 2a) than it is elsewhere in the travel of the door (see FIGS. 2b to 2f).

The eccentric cam 54, in conjunction with the spring pair 58, operates to substantially counterbalance the weight of the door throughout the range of motion of the door. As the door first opens, the primary component of motion of the door is rearwardly. Thus, the closing torque applied by the door remains substantially unchanged. With the spring pair 58 slackening more slowly at this point, the spring pair may continue to effectively counterbalance the door. As the door continues to open, the closing torque it applies diminishes (as an increasing portion of the top of the door moves overcentre of pivots 44, 48). Thus, with continued opening of the door, the cam 54 may allow the spring pair 58 to slacken more quickly and the spring pair will still counterbalance the weight of the door while avoiding the door moving to its fully open position unassisted. In the result, the eccentric cam 54 and the spring pair 58 permit accurate counterbalancing of a large and heavy cargo door 22 throughout its range of motion thereby allowing safe operation of the door.

Having upper link pivot 46 approximately vertically and horizontally aligned with the centre of gravity of the door improves the balance of the door. This also allows the upper link 26 to carry most of the weight of the door thereby facilitating the tilting of the door by the lower link 28.

As the door moves toward its door closed position (of figure 2a), the first co-operating cam 70 engages the second co-operating cam 72. These cams are configured so that as the door continues to close, the second co-operating cam pulls the first co-operating cam 70 inwardly such that the rear cargo door is pulled into the seal 74 at the back end of the walled cargo area. In the door closed position, the latch 76 latches to the pin 78 so as to latch the door 22 closed.

Modifications will be apparent to those skilled in the art and, therefore, the invention is defined in the claims.

What is claimed is:

1. A truck body comprising:
    a walled cargo area;
    a rigid rear cargo door for closing said cargo area;
    a four bar linkage having an upper link and a lower link each mounted by a pivot to a side wall of said walled cargo area and each mounted by a pivot to said rear cargo door;
    a linear distance between pivots of said lower link being longer than a linear distance between pivots of said upper link;
    an eccentric cam joined to one of said upper link and said lower link; and
    a tensioned spring extending around said eccentric cam such that, as said rear cargo door opens, said spring slackens.

2. The truck body of claim 1 wherein said eccentric cam is configured such that, as said rear cargo door is opened, said spring slackens more slowly proximate a closed position of said rear cargo door than proximate a point midway between a closed position and an opened position of said rear cargo door.

3. The truck body of claim 1 wherein said eccentric cam is configured such that, as said rear cargo door is opened, said spring slackens more slowly proximate a closed position of said rear cargo door than elsewhere in the range of travel of said rear cargo door.

4. The truck body of claim 1 wherein said spring has a coil portion with a tendon portion extending from one end of said coil portion, said tendon portion extending around said eccentric cam.

5. The truck body of claim 2 further comprising a first co-operating cam extending from said side wall and a second co-operating cam extending from said rear cargo door, said first and second co-operating cams arranged such that, as said rear cargo door is closed, said rear cargo door is pulled into a back end of said walled cargo area .

6. The truck body of claim 5 further comprising a seal extending along said back end of said walled cargo area.

7. The truck body of claim 6 further comprising a stop defining a fully open position of said rear cargo door such that a top of said rear cargo door is spaced from a top of said walled cargo area.

8. The truck body of claim 7 wherein said upper link is generally C-shaped so as not to interfere with said walled cargo area when said rear cargo door is in said fully open position.

9. A truck body comprising:
    a walled cargo area;
    a rigid rear cargo door for closing said cargo area;
    a four bar linkage having an upper link and a lower link each mounted by a pivot to a side wall of said walled cargo area and each mounted by a pivot to said rear cargo door;
    a linear distance between pivots of said lower link being longer than a linear distance between pivots of said upper link; and
    a stop defining a fully open position of said rear cargo door such that a top of said rear cargo door is spaced from a top of said walled cargo area, wherein said stop is arranged such that in said fully open position said rear cargo door is substantially horizontally oriented with a portion extending over a top of said walled cargo area and wherein said upper link is generally C-shaped so as not to interfere with said walled cargo area when said rear cargo door is in said fully open position.

10. A rear cargo door opening mechanism for a truck having a walled cargo area comprising:
- a four bar linkage having an upper link and a lower link each for mounting by a pivot to a side wall of said walled cargo area and each for mounting by a pivot to said rear cargo door;
- a linear distance between pivots of said lower link being longer than a linear distance between pivots of said upper link;
- an eccentric cam joined to one of said upper link and said lower link;
- a spring for extending around said eccentric cam such that, in use, said spring is in tension and as said rear cargo door opens, said spring slackens;
- said eccentric cam configured such that, in use, as said rear cargo door is opened, said spring slackens more slowly proximate a closed position of said rear cargo door than proximate a point midway between a closed position and an opened position of said rear cargo door.

11. The rear cargo door opening mechanism of claim 10 wherein said spring has a coil portion and a tendon portion extending from one end of said coil portion, said tendon portion, in use, extending around said eccentric cam.

\* \* \* \* \*